United States Patent [19]

Ströcker

[11] Patent Number: 4,721,425
[45] Date of Patent: Jan. 26, 1988

[54] APPARATUS FOR CONVEYING BULK MATERIAL IN SILOS

[75] Inventor: Günter Ströcker, Holzwickede, Fed. Rep. of Germany

[73] Assignee: Gustav Schade Maschinenfabrik GmbH & Co., Dortmund, Fed. Rep. of Germany

[21] Appl. No.: 854,439

[22] Filed: Apr. 21, 1986

[30] Foreign Application Priority Data

Apr. 25, 1985 [DE] Fed. Rep. of Germany ....... 3514888

[51] Int. Cl.⁴ ............................................. B65G 65/38
[52] U.S. Cl. ................................... 414/298; 414/299; 414/300; 414/317; 414/327; 222/523
[58] Field of Search ............... 414/298, 299, 300, 301, 414/302, 313, 316, 317, 325, 327, 320, 321, 322; 222/523; 193/30; 406/114, 167

[56] References Cited

U.S. PATENT DOCUMENTS

| 772,911 | 10/1904 | Acklin . |
| 2,500,043 | 3/1950 | Radtke ........................... 414/317 X |
| 2,580,306 | 12/1951 | Leach et al. ..................... 406/114 X |
| 2,649,215 | 8/1953 | Dickson . |
| 3,075,657 | 1/1963 | Hazen . |
| 3,358,856 | 12/1967 | Weibull . |
| 4,022,335 | 5/1977 | Lambert, Jr. . |
| 4,645,403— | 2/1987 | Dewit ............................... 414/317 |

FOREIGN PATENT DOCUMENTS

| 209954 | 8/1959 | Austria . |
| 831519 | 2/1952 | Fed. Rep. of Germany . |
| 1250360 | 9/1967 | Fed. Rep. of Germany . |
| 1988164 | 4/1968 | Fed. Rep. of Germany . |
| 1456866 | 12/1969 | Fed. Rep. of Germany . |
| 1933337 | 1/1971 | Fed. Rep. of Germany . |
| 3151841 | 5/1984 | Fed. Rep. of Germany . |
| 3135439 | 12/1984 | Fed. Rep. of Germany . |
| 430583 | 8/1967 | Switzerland . |
| 1146938 | 3/1969 | United Kingdom . |
| 264154 | 6/1970 | U.S.S.R. ............................. 222/523 |

Primary Examiner—Frank E. Werner
Assistant Examiner—Stuart J. Millman
Attorney, Agent, or Firm—Body, Vickers & Daniels

[57] ABSTRACT

The invention relates to an apparatus for supplying a silo with bulk material and for discharging the bulk material from the silo, using a clearing unit which can be raised and lowered in the silo, and which at the same time is mounted pivotably about the silo axis. In the silo a draw-off shaft is in the form of a telescopic gravity-descent tube, via which the bulk material removed by the clearing unit is conveyed out of the silo.

In this invention the clearing unit is connected via a bearing to a bridge girder which extends transversely across through the silo and which at its ends is guided in vertical guides on the silo wall. The operating forces are transmitted to the silo wall via the bridge girder.

20 Claims, 7 Drawing Figures

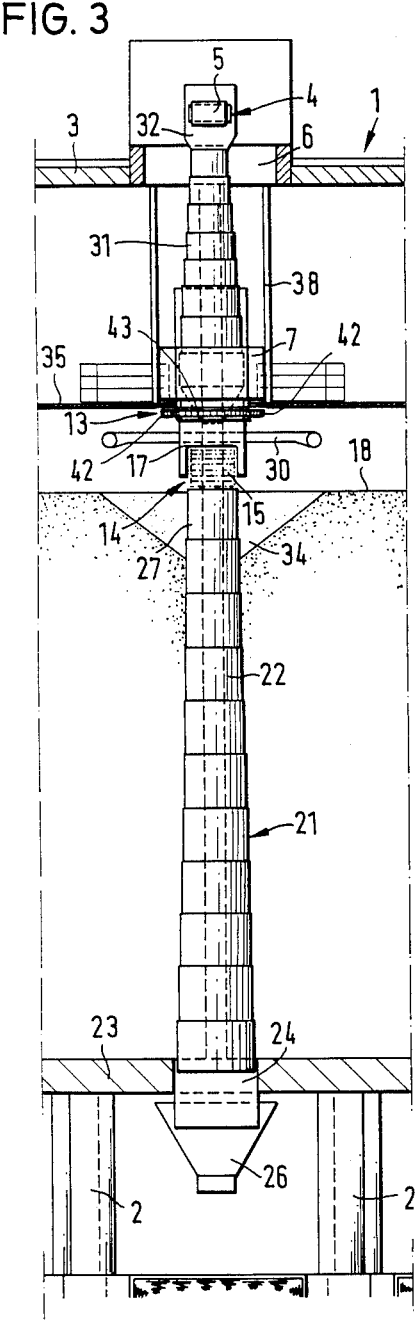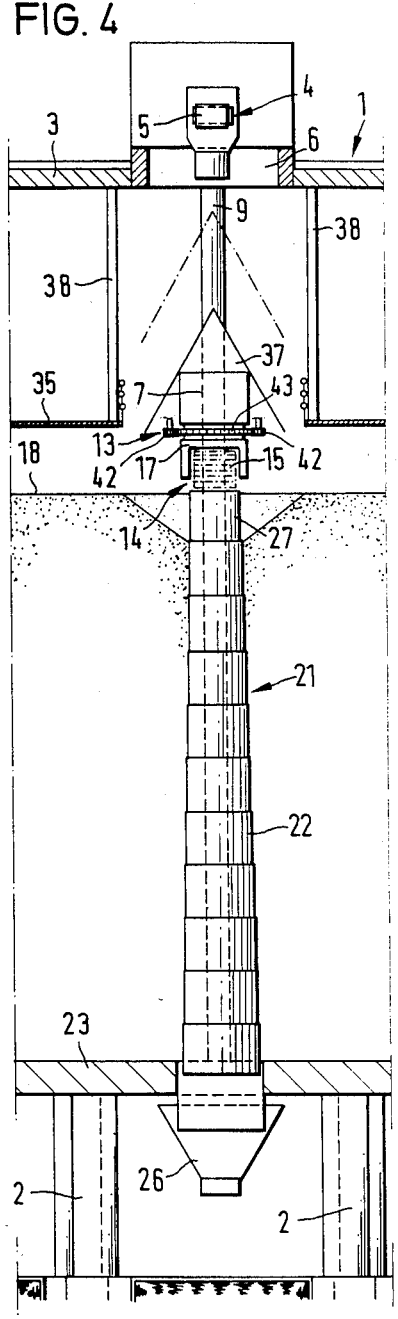

APPARATUS FOR CONVEYING BULK MATERIAL IN SILOS

BACKGROUND OF THE INVENTION i. Field of the Invention

The invention relates to an apparatus for conveying bulk material in silos, with feed means which dumps the bulk material to be introduced into the silo, and discharge means for discharging bulk material from the silo. The discharge means has a clearing unit, which works on the surface of the heap of bulk material and can be raised and lowered in the silo by means of a lifting mechanism. The clearing unit is rotatable about the vertical silo axis by means of a rotary drive. A telescopic gravity-descent tube is arranged in the silo and is provided at its top end region with a bulk-material inlet. It is coupled to the clearing unit, and follows the vertical movements of the clearing unit by being retracted and extended telescopically. The invention also extends to silos fitted with the apparatus.

ii. Summary of the Prior Art

Such apparatuses, with a telescopic gravity-descent tube standing in the heap of bulk material and forming a draw-off shaft intended for leading the bulk material to be discharged, to the silo bottom have been known for a long time for silos of small storage capacities, in particular for silos serving for receiving silage fodder or broken ice (German Auslegeschrift No. 1,250,360, German Patent Specification No. 831,519). In these known apparatuses, the clearing unit pivotable about the silo axis is mounted at the top end of the telescopic gravity-descent tube and is pivotable by mans of friction wheels which run either on the cylindrical silo wall or on the surface of the heap of bulk material. For stabilisation, there can be arranged in the telescopic gravity tube a fixed vertical tube, on which the individual tubes of the telescopic gravity tube are guided.

Apparatuses of the type mentioned above, equipped with a telescopic gravity-descent tube, have not gained acceptance in practice for bulk-material silos of relatively large storage capacities. Insofar as the telescopic gravity tube is guided by a fixed vertical tube (German Patent Specification No. 831,519), this results in a considerably increased cost of construction. At the same time there is also the disadvantage that the conveying cross-section of the telescopic tube is greatly restricted by the fixed vertical tube standing in it, while the resistance to telescopic retraction of the telescopic tube is increased adversely because the individual tube sections are guided on the vertical tube. An unsupported telescopic gravity-descent tube is known, that is to say one which is not guided by a fixed vertical tube, and instead of this, the clearing unit is supported and guided on the cylindrical silo wall by means of supporting rollers (German Auslegeschrift No. 1,250,360). When this arrangement is used, there is no guarantee of reliable vertical guidance of the telescopic tube, if only because, owing to the construction, there is a greater radial play of the clearing unit relative to the silo wall and the clearing unit running on the heap of bulk material by means of drive rollers unavoidably assumes oblique positions and, during operation, executes wobbly movements which result in tilting of the tube sections of the telescopic gravity-descent tube and consequently lead to failure of the installation.

For the storage of bulk material in silos of large storage capacity, the silos used in practice have a drawoff shaft which is arranged fixedly in the silo. The clearing unit pivots about the axis of this shaft which at the same time serves for guiding the clearing unit during its up- and down-movements (German Offenlegungsschrift No. 1,933,337, German Offenlegungsschrift No. 1,456,866, German Utility Model No. 1,968,164, German Patent Specification No. 3,135,439, German Patent Specification No. 3,151,841, U.S. Pat. Nos. 3,358,856, 2,649,215 and 772,911). In the apparatuses mentioned above, the draw-off shaft has a plurality of bulk-material inflow orifices distributed over its length and its periphery. Scraper booms, bucket chains, conveyor screws, clearing wheels and the like are used as clearing units. The arrangement of a central draw-off shaft serving at the same time for guiding the clearing units results in relatively heavy constructions involving a relatively high outlay and moreover, as regards storage materials inclined to stick and become compacted, such as, for example, gypsum, difficulties arise during the discharge operation.

SUMMARY OF THE INVENTION

The invention resorts to the known proposals to use, for draw-off, a telescopic gravity-descent tube which is supplied with the bulk material from above by the clearing unit operating in the silo and which discharges the material downwards through the silo bottom. The object of the invention is to provide an apparatus for conveying material in silos, which may be intended for storing granular bulk materials in large silos, and in which apparatus a telescopic gravity-descent tube is guided effectively in the silo and the operating forces can be transmitted reliably in the direction of the silo wall over a short distance. In a preferred design, the aim is also to achieve a reduced cost of construction, whilst at the same time ensuring a high performance of the feed and discharge apparatus and greater accessibility of the latter.

According to the invention, there is provided apparatus for conveying bulk material in silos, comprising feed means for dumping bulk material introduced into the silo, and discharge means for discharging bulk material from the silo, which discharge means includes clearing means to remove material from the surface of bulk material in the silo, and which is movable vertically and rotatably within the silo, and a telescopic gravity-descent tube having a bulk material inlet at its top, and which is coupled to the clearing means to follow the vertical movements thereof by telescopic extension and retraction, characterised in that the apparatus includes a bridge girder extending across the silo, with its ends engaging vertical guides on the silo wall so that the bridge girder is constrained against rotation, and lifting means to raise and lower the bridge girder the clearing means being pivotally mounted beneath the bridge girder, so as to move vertically with the bridge girder, and drive means being provided to rotate the clearing means around an upright axis relative to the bridge girder. According to a further aspect of the present invention the bridge girder is at the same time a carrier for a bulk material distributor device which is used to dump the bulk material fed by a telescopic feed tube in the silo.

The bridge girder preferably extends diametrically across the shaft. However, it could be a cross or star shaped frame having three or more ends guided on the silo wall.

In the apparatus according to the invention, the bridge girder forms the supporting backbone of the discharge means and of at least part of the feed arrangements for introducing the bulk material. Since the bridge girder is supported at its ends against rotary movement by means of the vertical guides on the silo wall and is guided in the vertical travel direction, the operating forces of the pivotable clearing means can be reliably transmitted via the bridge girder to the vertical guides and consequently to the silo wall. The telescopic gravity-descent tube is not subjected to the operating forces. Because it is connected to the guided bridge grader, it is supported and guided reliably in the silo. A fixed vertical tube of the known type arranged in the telescopic gravity tube is not required. On the contrary, a telescopic gravity-descent tube free of fittings restricting the conveying cross-section can be used. By virtue of the telescopic tube, bulk-material discharge can be carried out even when bulk material tending to stick and solidify, for example gypsum or a bulk material with similar behaviour, is stored in the silo.

The bridge girder also ensures better accessibility of the devices connected to it. It is expedient that guide rails, on which the bridge girder is guided by means of guide shoes, are arranged on the silo wall to constitute the abovementioned vertical guides of the bridge girder. In this way, the top end of the telescopic gravity tube can be guided exactly vertically with only a very slight radial play. At the same time, the weight of the bridge girder and of the devices arranged on it increases the force which, during the discharge work, ensures reliable retraction of the telescopic tube, pushing it in against the adhesive and frictional resistances of the bulk material. It is also advantageous if the clearing unit arranged on the underside of the bridge girder always works in a specific working plane, so that oblique positions and wobbling movements of the clearing unit are avoided and constant discharge outputs can be achieved.

The clearing means is preferably mounted beneath the bridge girder by means of a rotary joint or bearing. Preferably this serves to mount a rotary member centrally on the bridge grider, with this rotary member being rotatably about the silo axis by means of the said drive means and acting as a carrier for the clearing unit. The pivoting mechanism of the clearing unit is accordingly arranged, together with the rotary member, on the silo axis.

As stated above, the bridge girder is at the same time a carrier for bulk material distributor device, by means of which the bulk material to be introduced is dumped into the silo, it being possible to distribute the bulk material dumped in the silo by the distributor device more less uniformly over the silo cross-section by means of the clearing unit, the working direction of which is, if appropriate, reversible. The arrangement is such that a central telescopic feed tube is arranged between the discharge end of a feed conveyor arranged at the top of the silo and the bridge girder carrying the bulk material distributor device. This telescopic feed tube is connected at its bottom end to the bridge girder so that it can follow the up-and-down movements of the bridge girder by being retracted and extended telescopically. The said bulk-material distributor device can be arranged on the bridge girder itself or, in a preferred design, on the rotary member carried by the bridge girder, so that it is pivoted about the silo axis by the rotary member and only a single pivoting drive is required for the rotary movement of the clearing unit and of the distributor device. A dumping conveyor, generally a distributor band or the like, for example an endless belt, band of plates or the like, can be used for the bulk-material distributor device, as is known for these purposes. Accordingly, when the bulk material is introduced, the distributor device or the distributor band or the like executes a pivoting movement, with the result that the bulk materials is dumped over an annular path. However, instead of the abovementioned distributor band or the like, an inclined guard or the like can also be provided on the bridge girder. In this case too, the abovementioned telescopic feed tube can be provided.

As mentioned, the telescopic gravity-descent tube is connected to the bridge girder, preferably by being connected to the rotary member mounted on the bridge girder. The connection between the telescopic gravity tube and the bridge girder or the rotary member carrying the clearing unit can be made by means of a rotary coupling, so that the upper tube section of the telescopic gravity tube does not participate in the rotary movement of the rotary member.

Different devices can be used for the clearing unit. These can also be designed so that, by reversing their working direction, the bulk material dumped into the silo can be conveyed either outwards in the direction of the silo wall or inwards in the direction of the telescopic gravity-descent tube, so that, during feeding into the silo, a uniform distribution of the bulk material delivered can be achieved over the silo cross-section, whilst at the same time ensuring a plane bulk-material surface. This allows the storage capacity of the silo to be fully utilised and also makes it possible to change over quickly from feeding to discharge and vice versa.

A scraper boom will advantageously be used as a clearing unit, and this is preferably arranged on the driven rotary member connected to the bridge girder via the revolving joint. Also, two scraper booms located diametrically opposite one another may be provided, to achieve weight equalisation and high discharge outputs. The scraper boom or scraper booms are appropriately connected to the rotary member so as to be vertically pivotable to a limited extent in a joint. At the same time, there is advantageously a limit switch or other detector which supplies a signal at a predetermined maximum pivoting angle of, for example, 5° to 8° of the scraper boom. Upward-swinging-out movements of the scraper boom or scraper booms occur, above all, when the stored bulk material solidifies excessively, that is to say when the conveying output of the scraper boom is too low for a given lowering speed of the latter. To prevent serious damage here as a result of excessive stresses, at a predetermined pivoting angle of the discharge unit the abovementioned limit switch supplies a signal which switches off the installation or which increases the rotational speed of the scraper chain.

A rotating clearing beam, clearing wheel or other radially extending member(s) can also advantageously be used for the clearing means and this is or these are provided with blade-like or ploughshare-like clearing elements inclined at an acute angle relative to the radial. Depending on the direction of rotation, the bulk material can be conveyed radially outwards or radially inwards by means of such a clearing unit. The hub of the clearing wheel is appropriately formed by the abovementioned rotary member mounted to the bridge by the rotary joint.

BRIEF DESCRIPTION OF THE DRAWINGS

The invention is explained in detail below in relation to the exemplary embodiments illustrated in the drawing. In the drawing:

FIG. 3 shows the apparatus according to FIGS. 1 and 2 in a vertical section through the silo, rotated 90° relative to FIG. 1;

FIG. 4 shows, in the section of representation of FIG. 3, a modified embodiment of the feed device;

DESCRIPTION OF PREFERRED EMBODIMENTS

Figure 1:
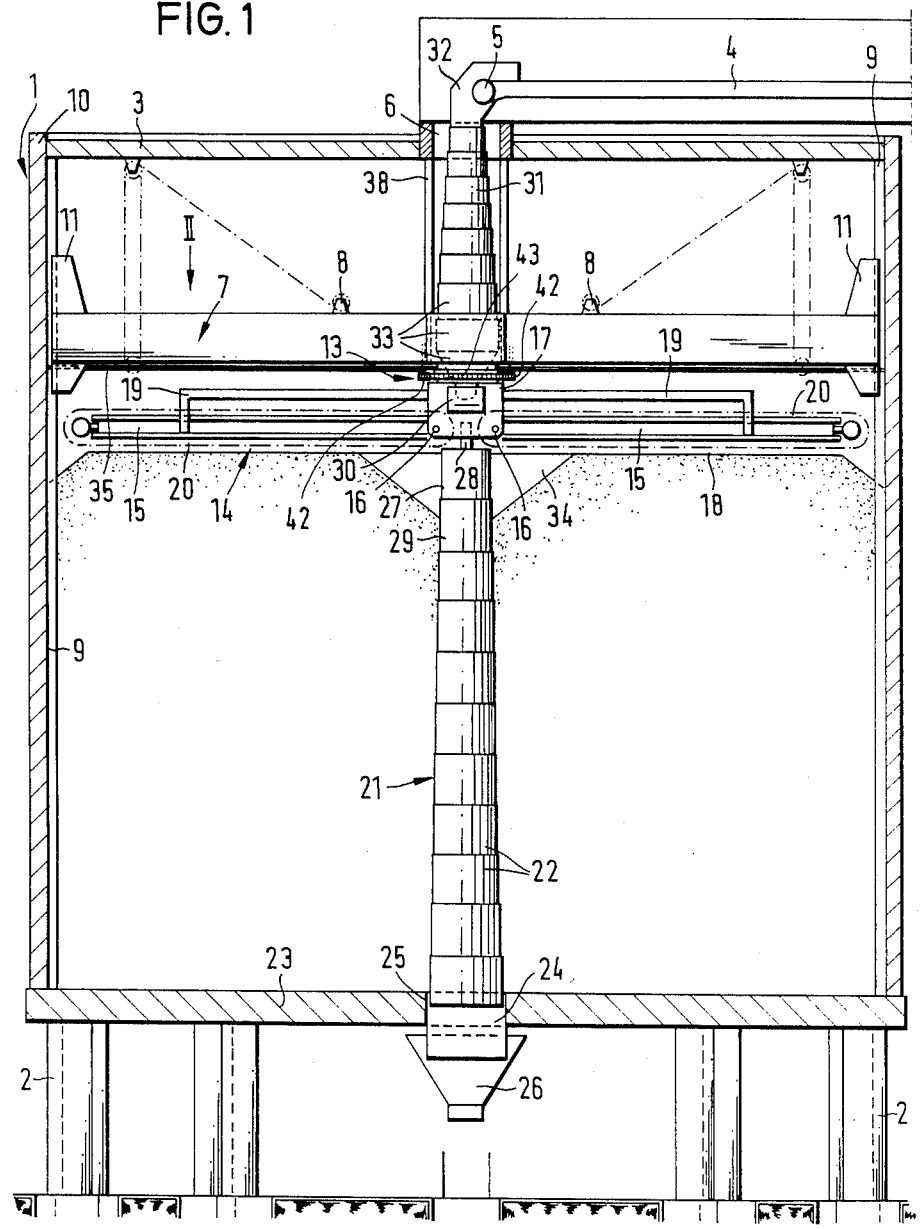
FIG. 1 shows, in a vertical section through a silo, an apparatus according to the invention for supplying the silo with bulk material and for discharging the bulk material from the silo.

In the drawing, 1 denotes a round silo which is elevated on legs 2 and which is designed as a large silo for storing granular bulk materials, such as, for example, gypsum and the like. For supplying the silo 1 with the bulk material, a feed device is provided in the upper region of the silo, and for discharging the bulk material from the silo 1 a discharge device is provided inside it.

The bulk-material feed device has a feed conveyor 4 which is arranged in a fixed position on the top or ceiling 3 of the silo 1. It consists of a conveying band or belt, the discharge end 5 of which is located above an aperture 6 provided in the centre of the ceiling 3. Inside the silo 1, there is a stable bridge girder 7 which extends transversely across the silo. This girder 7 can be raised and lowered vertically in the silo by means of a lifting mechanism which here consists of several rope winches 8. The bridge girder 7 consisting, for example, of a framework construction is guided so as to be constrained against rotation. For this purpose its ends are guided in vertical guides 9 located on the silo wall 10 and extending essentially over the entire iner height of the silo. The vertical guides 9 consist of guide rails which are formed as ribs on the silo wall or are fastened to the silo wall. The bridge girder 7 has, at each of its ends, a guide shoe 11 which is provided with a guide groove 12 or the like for the engagement of the vertical guide 9. It is important that the bridge girder 7 is supported on the silo wall 10 constrained against rotation by the vertical guides 9 and yet at the same time is able to be raised and lowered in the silo by means of the lifting mechanism 8.

Mounted on the underside of the bridge girder 7 via a rotary joint 13 with a vertical axis of rotation is a clearing unit 14. This has two scraper booms 15 which are arranged at approximately the same height and in line with one another and which are each mounted so as to be vertically pivotable to a limited extent in a joint 16 on a rotary member 17 connected to the bridge girder 7 via the rotary joint 13. The rotary member 17 is rotatably about the vertical silo axis by means of a rotary drive 41 (shown only in FIGS. 5 and 6), the driven pinions 42 of which mesh with a toothed ring 43 on the rotary member 17, the two scraper booms 15 then executing pivoting movements over the surface 18 of the heap of bulk material located in the silo. Each of the two scraper booms 15 is supported near its outer free end by a supporting boom 19 connected rigidly to the rotary member 17. As is customary, the two scraper booms 15 each have an endless scraper chain band which is fitted with scrapers and which is indicated in FIG. 1 at 20 merely by dot-and-dash lines. This band scrapes material longitudinally of the boom. The drive of the scraper chain bands 20 is reversible, so that the scraper chain band can revolve in both directions of rotation.

A draw-off shaft 21 for conveying the bulk material out of the silo 1 is located in the centre of the silo. The draw-off shaft 21 consists of a telescopic gravity-descent tube 22, that is to say material falls down it under gravity. This tube 21 is arranged centrally in the silo and tapers from the silo bottom 23 towards the bridge girder 7. The tube's section 24 of largest diameter passes through a central bottom orifice 25, a funnèl outlet 26 being arranged under its bulk-material outflow orifice. Instead of this, the telescopic gravity-descent tube 22 can also be arranged with its bottom discharge end above a discharge conveyor located under the silo bottom 23. The tube section 27 is the smallest diameter section of the telescopic tube 22. This is connected to the rotary member 17 via a rotary coupling 28 which here consists of a pivot-pin connection. It is also possible, however, to connect the smallest tube section 27 to the rotary member 17 to rotate therewith and provide a revolving joint between this tube section 27 and the next tube section 29. The upper tube section 27 has a bulk-material feed aperture which is formed by the end of this tube section open at the top and, if appropriate, by casing orifice in this tube section. The telescopic tube 22 is designed so that it can follow the up-and-down movements of the bridge girder 7 and of the clearing unit 14, but does not participate in the pivoting movement of the clearing unit 14 around the silo axis.

Figure 2:
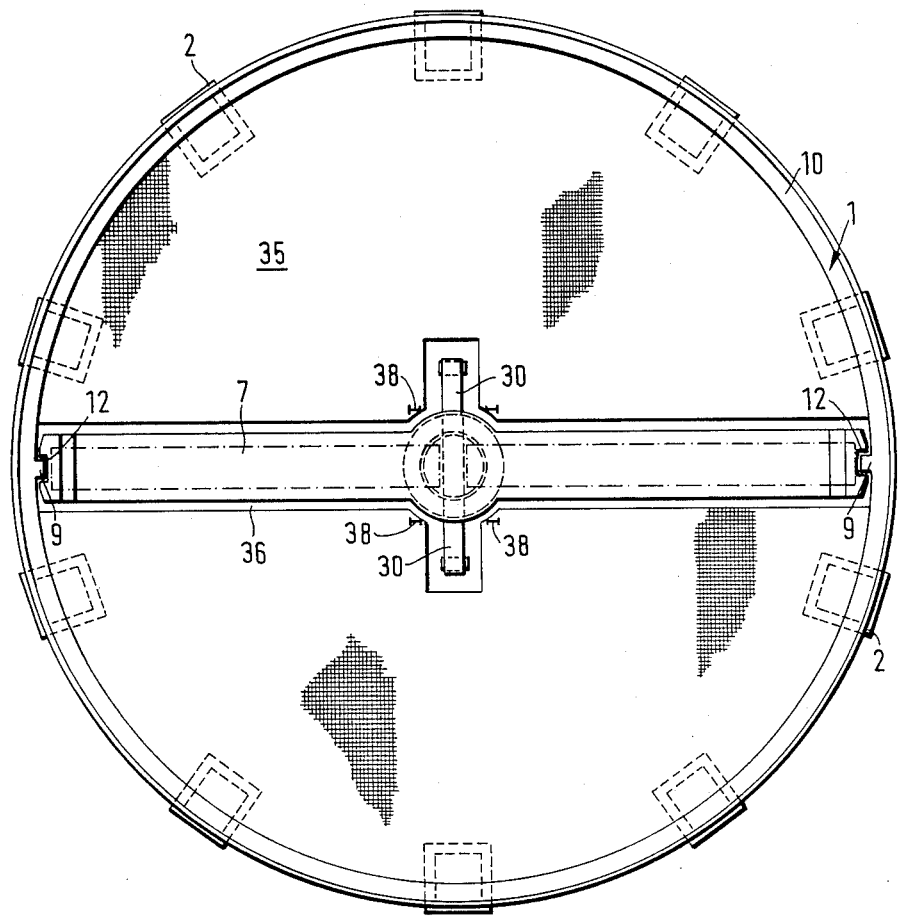
FIG. 2 shows a plan view in the direction of the arrow II of FIG. 1.

A bulk-material distributor device located downstream of the abovementioned feed conveyor 4 is also arranged on the bridge girder 7. This bulk-material distributor device consists of a distributor band 30 arranged on the rotary member 17, preferably at an angle of approximately 90° relative to the two scraper booms 15 and the axis of the bridge girder 7, as shown in FIG. 2. The distributor band 30 can consist of a belt band; an endless band of plates or some other kind of dumping band. As shown in FIG. 1, the rotary member 17 has an inner opening receiving the distributor band. Between the dumping end 5 of the upper feed band 4 and the rotary member 17 is arranged a telescopic feed tube 31 which dumps the incoming bulk material onto the distributor band 30, approximately in the centre. The telescopic feed tube 31 is fixed by means of its tube section 32 of smallest diameter in the region of the dumping end 5 of the feed conveyor 4, whilst by means of its lower tube section 33 of larger diameter it passes through central openings in the bridge girder 7, in the rotary joint 13 designed, for example, as a turntable bearing, and in the rotary member 17, its lower dumping end being located above the distributor band 30. The telescopic feed tube 31 is designed so that it can follow the vertical travel of the bridge girder 7 by being extended or retracted telescopically, like tube 22.

During the feed operation, the bulk material supplied centrally from above via the feed conveyor 4 and the telescopic feed tube 31 is dumped into the silo by means of the distributor band 30. The rotary member 17 and consequently the distributor band execute a rotary movement about the silo axis, so that the bulk material is dumped into the silo to form an annular heap. The scraper chains 20 of the scraper booms 15 are driven so that they convey the bulk material radially outwards beyond the surface 18 of the heap of bulk material and distribute it uniformly, so that the silo is filled uniformly, whilst a plane surface 18 of the heap of bulk material is ensured. During the silo feed, the bridge girder 7, together with the scraper booms 15, executes a slow upward movement, carried out by means of the lifting mechanism 8. Since the bulk material is prevented from forming a conical heap in the silo because of the distribution of the bulk material, the storage space of the silo can be utilised in a favourable way.

During the discharge of the bulk material from the silo 1, the scraper chains 20 of the two scraper booms 14 are driven in the opposite direction, so that they convey the bulk material towards the centre of the silo beyond the surface 18. The space 34 round the upper telescopic tube section 27, caused by the formation of a mound, is first filled with bulk material. As soon as this has occurred, the bulk material supplied by the scraper chains passes into the upper orifice of the tube section 27. The bulk material falls down through the telescopic tube 22 and can be drawn off underneath the silo bottom 23. During the discharge of the bulk material, the bridge girder 7, together with the clearing unit 14, executes a continuous downward movement which ends when the clearing unit reaches the silo bottom. As mentioned, the telescopic tubes 21 and 31 can follow the up-and-down movements. The operating forces arising during the feeding and discharge of the bulk material are transmitted to the silo wall 10 via the bridge girder 7 and the vertical guides 9. The telescopic tube 21 is not subjected to the operating forces and also does not serve as a rotary guide for the clearing unit 14 pivotable about the silo axis. The bridge girder 7 makes it possible to gain access readily to the devices located in the silo. It is recommended to provide in the upper region of the silo a fixed platform 35 which, as in FIG. 2, has a cut-out 36 matching the contour shape of the bridge girder 7 and of the distributor band 30 projecting transversely relative to this, so that the bridge girder 7, together with the components carried by it, can be guided through the aperture 36 of the platform 35, in order, for example, to carry out repair and maintenance work from the platform.

The embodiment according to FIG. 4 differs from that according to FIGS. 1 to 3 only in that the bulk-material distributor device located downstream of the feed conveyor 4 consists of a roof-shaped inclined shield 37 which is fastened to the bridge girder 7 and which engages over this, so that the bulk material dumped into the silo 1 by the feed conveyor 4 is guided onto the heap of bulk material off-centre via the shield 37. There is no need for the distributor band 30 and the telescopic feed tube 31 here. The abovementioned platform 35 is connected in the peripheral region to the silo wall 10 and in the inner region via tension members 38 to the ceiling 3.

It goes without saying that the stroke speed of the bridge girder 7 during the discharge of the bulk material has to be coordinated with the conveying speed of the clearing unit 14. If overloading of the scraper booms 15 occurs, as arises particularly where solidified bulk material is concerned, these can be pivoted slightly upwards in their joints 16. The supporting booms 19 are coupled to the scraper booms 15, for example, by means of bolt-/slot connections or the like, so that these pivoting movements are possible through small angles of, for example, 5°. When a predetermined pivoting angle is reached, a signal is transmitted, for example via an angle indicator or switch and the like, and either stops the entire apparatus or reduces the travel speed of the of the bridge girder.

Figure 5:
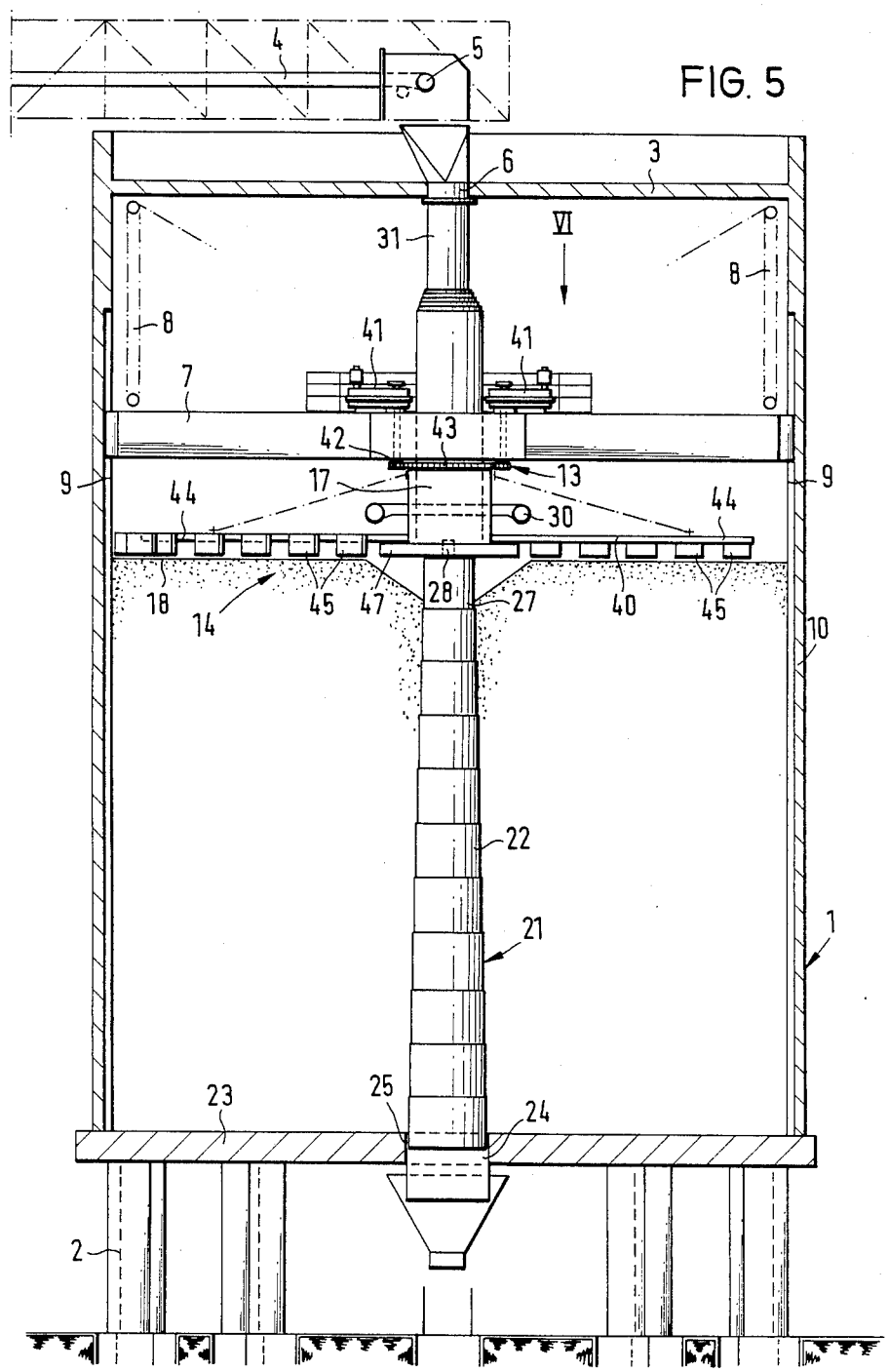
FIG. 5 shows a further exemplary embodiment of the invention, likewise in a vertical section through a silo.
Figure 6:
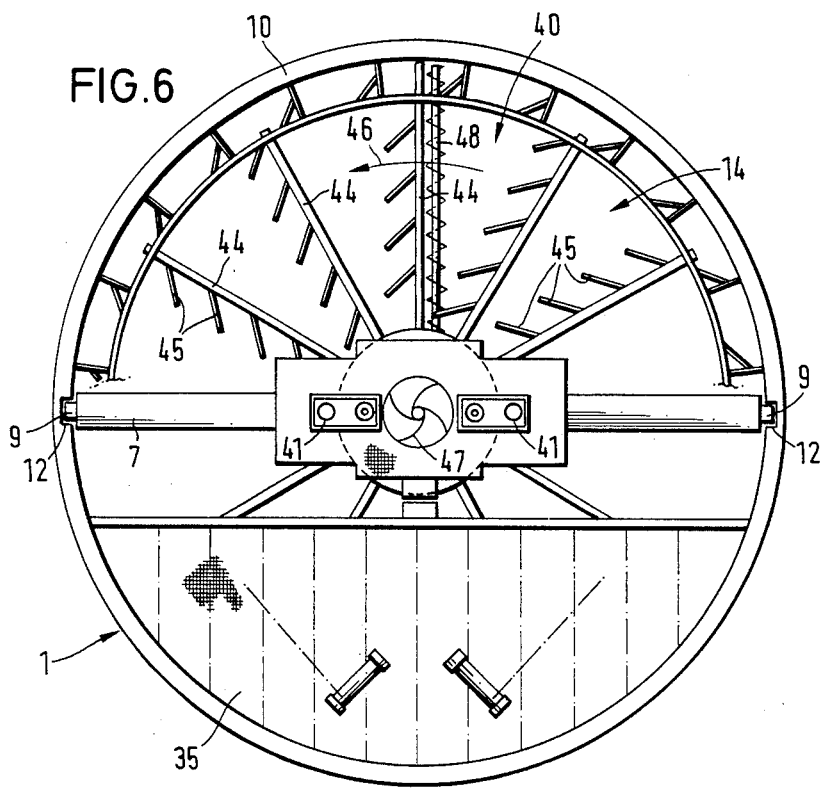
FIG. 6 shows a plan view in the direction of the arrow VI of FIG. 5.

The embodiment according to FIGS. 5 and 6 differs from that according to FIGS. 1 to 3 essentially only in that its clearing unit 14 is not formed by the scraper booms 15 but instead comprises a clearing wheel 40 which is rotatable about the vertical silo axis. The clearing wheel 40 is connected rotatably, via the rotary member 17 and the rotary joint 13, to the bridge girder 7 which at its ends is guided in the vertical guides 9 on the silo wall 10. The rotary drive 41 of the clearing wheel 40 is located on the bridge girder 7. The drive is effected via pinions 42 which mesh with a toothed ring 43 of the rotary member 17.

The clearing wheel 40 consists of a spoked wheel, the hub of which is formed by the rotary member 17. Arranged on the radial spokes 44, at a radial spacing from one another, are respective ploughshare-like clearing members 45 which consist of fixed guide plates and which, as shown in the plan view of FIG. 6 are provided at an acute angle relative to the radial direction and offset radially relative to one another on the successive spokes 44, in wuch a way that, when the clearing wheel 40 rotates in the direction of the arrow 46, the bulk material is conveyed from outside inwards in the direction of the telescopic tube 22. In contrast, when the direction of rotation of clearing wheel 40 is changed, the bulk material is conveyed radially from inside outwards in the direction of the silo wall 10, so that the bulk material dumped from above onto the heap of bulk material can be distributed over the cross-sectional surface of the silo by means of the clearing wheel. Arranged in the centre of the clearing wheel above the telescopic tube 22 are sickle-shaped guide blades 47 which assists the transfer into the telescopic tube 22 of the bulk material conveyed inwards by the clearing wheel 40.

As can be seen in FIG. 6, here the platform 35 can be designed so that it covers only a segment of the circular silo, specifically outside the stroke region of the bridge girder 7. Where bulk material solidified to a relatively great extent is concerned, it is recommended to provide the clearing unit with one or more driven milling cutters which loosen the bulk material on the surface 18. FIG. 6 indicates at 48 such a driven milling cutter which here, is located on the spoke 44 of the clearing wheel 40.

Figure 7:
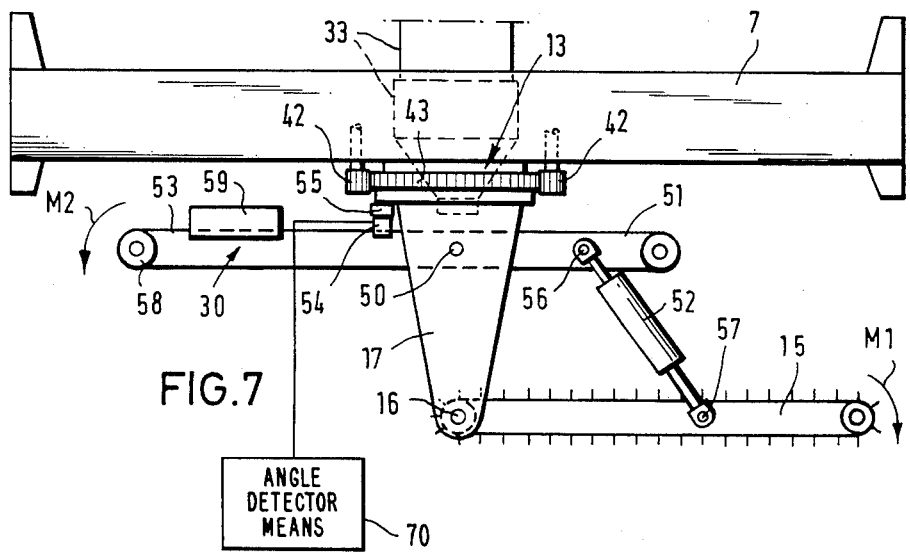
FIG. 7 shows in a partial side view a preferred embodiment of a bulk material distributor means and of a clearing unit arranged on a common rotary member.

FIG. 7 shows in a side view a preferred embodiment of the clearing and distributor means mounted on the rotary member 17. Differing from the embodiment of FIGS. 1, 2 and 3 only a single scraper boom 15 is mounted on the rotary member 17. The distributor or dumping conveyor 30 which discharges the bulk material fed by said telescopic feed tube 31 into said silo and for which, preferably, a distributor band of the abovementioned kind is used, is mounted on the rotary member 17 opposed to the scraper boom 15 so as it will at least partially balance the weight of the scraper boom 15, which apparently offers advantages with regard to the load conditions on the rotary member 17 as well as on the rotary joint 13, the bridge girder 7 and the vertical guides 9.

In the preferred embodiment the distributor conveyor 30 is mounted in the manner of a two-armed lever above the joint 16 of the scraper boom 15 by a joint or pivot bearing 50, the axis of which extends parallel to the horizontal pivot axis of the joint 16. The arm or portion 51 of the distributor conveyor 30 extending into the direction of the scraper boom 15 is coupled with the scraper boom 15 by means of a coupling member 52. The connection joints of the coupling member 52 with the upper distributor conveyor 30 and the lower scraper boom 15 are designed by reference numerals 56 and 57. The other arm or portion 53 of the distributor conveyor 30 arranged on the opposite side of the pivot bearing 50 is supported with a stop member 54 on a counter stop 55 of the rotary member 17. The distributor conveyor 30 is mounted in such a manner that only a part of the weight of the scraper boom 15 is balanced. Accordingly, during clearing operation the load moment M1 of the scraper boom 15 is partially balanced or compensated by the oppositely directed moment M2 extended by the distributor conveyor 30. The difference of said two moments M1–M2 is used for holding down the scraper boom 15 on the surface 18 of the heap of bulk material. If, during clearing operation, the scraper boom 15 which moves down together with the bridge girder 7 is lifted while pivoting about the axis of the joint 16, which lifting movement may occur e.g. in the case of a solidified or sticky bulk material, the distributor conveyor 30 is pivoted by the coupling member 52 with the result that the stop member 54 removes from the counter stop 55 of the rotary member 17. The relative movement of the two stops 54 and 55 which under normal operation conditions serve to support the differential moment M1–M2, may be sensed and transformed by simple means which are well-known in the prior art, such as angle detector means 70 as shown in FIG. 7 or switching means or the like, into a e.g. electric signal which stops or reduces the downward movement of the bridge girder 7 by controlling the lifting mechanism 8.

Preferably, a coupling member 52 is used which can be adjusted in its length, whereby the scraper boom 15 may be positioned into different tilting positions with respect to its horizontal position. On the other hand a rigid lever or the like may be used for the coupling member 52. If adjustability in length is desired, a hydraulic cylinder, an adjusting spindle device with a spindle drive motor or the like may be used for the coupling member 52.

In the embodiment shown in FIG. 7 the bulk material which is to be dumped into the silo 1 is discharged into the silo on the end 58 of the distributor conveyor 30, preferably near the silo wall 10, so that this bulk material can be distributed over the surface 18 of the heap by the scraper boom 15 conveying in the direction to the center of the silo. In this case it is not necessary to reverse the operation direction of the scraper chain of the scraper boom 15 for distributing operation.

It may be advisable to provide an additional counter weight 59 or mounting means for the additional counter weight 59 at the distributor conveyor 30, whereby the above-mentioned differential moment M1–M2 may be adjusted in accordance with the kind or condition of the bulk material to be cleared by the scraper boom 15. Preferably, this device 59 is a counter weight box or the like adapted to receive the counter weight.

In the exemplary embodiments illustrated in FIGS. 2 and 6, the bridge girder 7 is designed so that it extends transversely across the silo in the diametral direction and at its two opposite ends is guided on the vertical guides 9 of the silo wall via a guide shoe 11. It goes without saying that the bridge girder 7 can also consist of a cross-shaped or star-shaped supporting frame. In all the embodiments illustrated in the drawing, it is evident that the clearing units 14 are arranged so that their discharge end is located above the open top end of the telescopic gravity-descent tube 21, where the bulk material is conveyed into the telescopic gravity tube from above. When the silo is filled, the telescopic gravity-descent tube stands in the heap of bulk material. During the discharge operation, the telescopic tube 21 is forcibly pushed in by means of the weight of the bridge girder 7 and devices connected thereby bearing on the tube 21. It may be advisable to provide the outside surfaces of the individual tube sections 22 of the telescopic tube 21 with a surface coating preventing the adhesion of the bulk material, preferably consisting of wear-resistant plastic with good sliding properties, such as, above all, Teflon (polytetrafluoroethylene) or the like.

What is claimed is:

1. In an apparatus for conveying bulk material in a silo with a vertical axis, comprising
    feed means for dumping bulk material introduced into the silo, and discharge means for discharging bulk material from the silo, which discharge means comprises clearing means for removing material from the top surface of bulk material within the silo, and which is movable vertically and rotatably within the silo, and a gravity-descent tube in the silo, which tube has top and bottom ends defining a bulk material inlet at the top end thereof, to receive material from the clearing means, is telescopic and is coupled to the clearing means so as to follow vertical movement of the clearing means,
    the improvement comprising:
    a bridge girder having at least two ends adjacent the silo walls, and extending horizontally across the silo,
    vertical guides on the silo wall, engaging said ends of said bridge girder, thereby constraining said girder against rotation,
    lifting means to raise and lower said girder, in said silo,
    a rotary joint supporting said clearing means from and beneath said briidge girder, for said clearing means to move vertically with said bridge girder, and pivot around the vertical axis of the silo,
    drive means associates with said rotary joint for rotating said clearing means relative to said bridge girder,
    a feed conveyor at the top of the silo, distributor means carried by said bridge girder to dump incoming bulk material, and a telescopic feed tube having top and bottom ends and arranged to receive incoming material discharging from said feed conveyor, the said tube descending to said bridge girder and having its lower end connected to said bridge girder whereby said tube telescopically retracts and extends to follow vertical movement of said distributor means as carried by said bridge girder.

2. Apparatus according to claim 1 wherein said rotary joint pivotally mounts a rotary member to the middle of the bridge girder, said drive means acting to rotate said rotary member around the silo axis, and said rotary member carries said clearing means.

3. Apparatus according to claim 2 wherein the top end of said telescopic gravity-descent tube is connected to said rotary member.

4. Apparatus according to claim 3, comprising a rotary coupling between the telescopic gravity-descent tube and said rotary member.

5. Apparatus according to claim 1 wherein said rotary joint pivotally mounts a rotary member to the middle of the bridge girder, said drive means acting to rotate said rotary member around the silo axis, and said rotary member carries said distributor means, said distributor means being located underneath the lower end of said telescopic feed tube.

6. Apparatus according to claim 5 wherein said distributor means is an endless conveyor.

7. Apparatus according to claim 2 wherein said clearing means comprises at least one scraper boom extending from said rotary member, driven scraper chain means on said boom for scraping material longitudinally of the boom.

8. Apparatus according to claim 7 wherein two said booms extend from said rotary member in diametrically opposite directions.

9. Apparatus according to claim 7 comprising means pivotally attaching said boom to said rotary member so as to be pivotable in a vertical plane, and detector means generating a signal when said boom pivots to a predetermined maximum angle.

10. Apparatus according to claim 7 wherein said distributor means comprises a distributor conveyor mounted on said rotary member in such a manner that the weight of said scraper boom is balanced by said distributor conveyor at least partially.

11. Apparatus according to claim 10 wherein said distributor conveyor, which is arranged so as to partially balance the weight of said scraper boom, is mounted to said rotary member in the manner of a two-armed lever by a pivot bearing arranged above pivot means pivotally mounting said scraper boom to said rotary member, the one portion of the distributor conveyor which extends into the direction of said scraper boom is coupled with said scraper boom by a coupling member and the other portion of said distributor conveyor extending to the opposite direction is provided with stop means in contact with and supported by counter stop means of said rotary member.

12. Apparatus according to claim 11 wherein said coupling member is adjustable in its length.

13. Apparatus according to claim 11 wherein said detecting means are arranged to generate a signal if said stop means moves away from said counter stop means.

14. Apparatus according to claim 1 wherein said clearing means comprises at least one member extending radially and supporting plough elements inclined at an acute angle to the radial direction.

15. Apparatus according to claim 1 wherein said clearing means comprises a driven clearing wheel being provided with plough-like clearing elements inclined at an acute angle relative to the radial direction.

16. Apparatus according to claim 1 wherein said bulk material inlet to said gravity-descent tube is an open top end of said tube, and said clearing means discharges over said open top end.

17. Apparatus according to claim 1 wherein said vertical guides comprise rails on the silo wall and said bridge girder carries shoes at its ends which slidably engage the guide rails.

18. Apparatus according to claim 1 wherein the gravity-descent tube comprises a plurality of tube sections each provided with a coating inhibiting adhesion of bulk material.

19. Apparatus according to claim 18 wherein said coating is a wear-resistant, low friction plastic.

20. In an apparatus for conveying bulk material in a silo with a vertical axis, comprising:

feed means for dumping bulk material introduced into the silo, and discharge means for discharging bulk material from the silo, which discharge means comprises clearing means for removing material from the top surface of bulk material within the silo, and which is movable vertically and rotatably within the silo, and a gravity-descent tube in the silo, which tube has top and bottom ends which defines a bulk material inlet at the top end thereof, to receive material from the clearing means, is telescopic and is coupled to the clearing means so as to follow vertical movement of the clearing means, the improvement comprising:

a bridge girder having at least two ends adjacent the silo walls, and extending across the silo, vertical guides on the silo wall, engaging said ends of said bridge girder, thereby constraining said girder against rotation, lifting means to raise and lower said girder, in said silo, a rotary member;

a rotary girder supporting said rotary member from and beneath said bridge girder to be rotatable about said axis and to move vertically with said bridge girder;

said clearing means comprising at least one scraper boom having driven scraper chain means for scraping said bulk material longitudinally of said boom, said boom extending from said rotary member and being connected thereto to move vertically and to rotate about said axis with said rotary member, and to pivot with respect to said rotary member in a vertical plane;

said feed means comprising distributor means adapted to dump incoming bulk material and comprising a conveyor connected to said rotary member at a pivotal connection vertically above said scraper boom, said conveyor extending diametrically away from said rotary member with a first extending portion connected to said scraper boom by and adjustable coupling, and a second extending portion acting as a pivotal counterweight to said scraper boom;

stop means responsive to pivotal movement of said scraper boom in said vertical plane, said stop means comprising a stop member associated with said second extending portion of said conveyor, a counter-stop member associated with said rotary member, said stop member being adapted to contact said counter-stop member when said scraper boom is not pivoted, and to be carried out of contact with said counter-stop member by said second extending portion when said scraper boom is pivoted to a predetermined angle, and detecting means adapted to generate a signal when said stop means is out of contact with said counter-stop means, drive means for rotating said clearing means and said distributor means relative to said bridge girder through said rotary member;
a feed conveyor at the top of the silo; and,
a telescopic feed tube having top and bottom ends and arranged to receive incoming material discharging from the feed conveyor, the said tube descending to the bridge girder and having its lower end connected to the bridge girder.

* * * * *